Patented Sept. 14, 1954

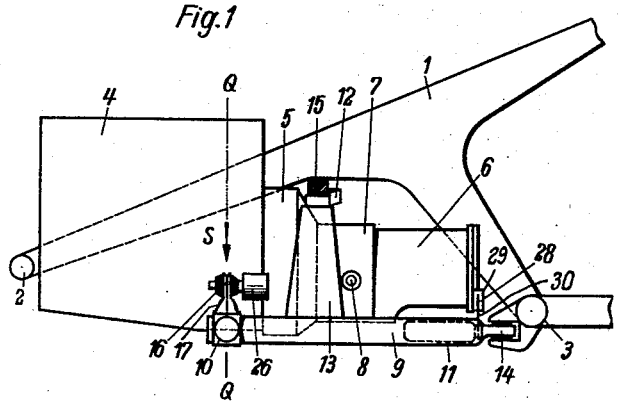
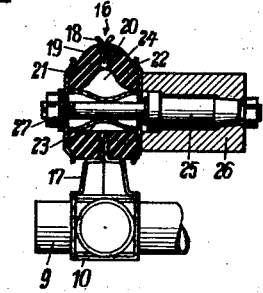
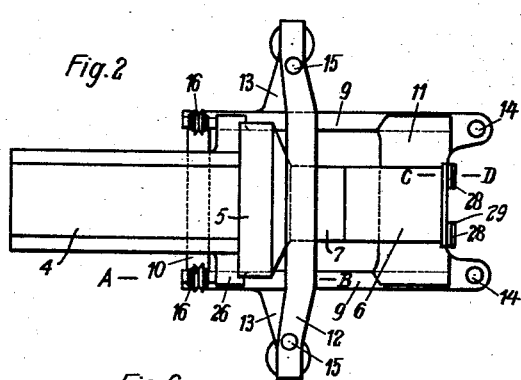
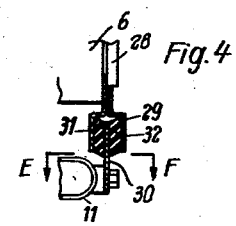
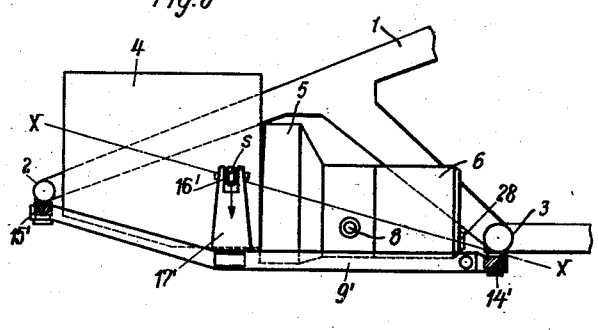

2,689,014

UNITED STATES PATENT OFFICE 2,689,014

RESILIENT MOUNTING OF DRIVE AGGREGATE IN MOTOR VEHICLES

Friedrich K. H. Nallinger and Joseph Dauben, Stuttgart, Germany, assignors to Daimler-Benz Aktiengesellschaft, Stuttgart-Unterturkheim, Germany Application April 5, 1950, Serial No. 154,028

Claims priority, application Germany April 5, 1949

7 Claims. (Cl. 180—64)

The invention relates to a drive aggregate for motor vehicles and more particularly to a resilient suspension of the kind described. It is an object of this invention to achieve an improved taking up or dampening of the forces, in particular of the blows and vibrations caused by the motor. It is another object of this invention to take up the weight of the drive aggregate in a favorable manner.

Further objects and advantages of the present invention will become apparent from the following detailed description of the invention in connection with the appended drawings showing by way of example several embodiments of the present invention.

In the drawings:

Fig. 1 shows an elevation of a drive aggregate on a sub-frame which is suspended elastically from a self-supporting car body;

Fig. 2 shows a top view of the arrangement shown in Fig. 1;

Fig. 3 shows a vertical section on an enlarged scale taken along the line A—B of Fig. 2;

Fig. 4 shows a vertical section on an enlarged scale taken along the line C—D of Fig. 2;

Fig. 5 shows a top view of part of the arrangement shown in Fig. 4 in a section along the line E—F; and Fig. 6 shows an elevation of a modified embodiment.

In Fig. 1 the supporting framework of a self-supporting motor vehicle body structure 1 is for example stiffened by a front cross girder 2 and a cross girder 3, which is located behind the engine. The drive aggregate, designed for example for a front-wheel drive, comprises an engine 4, a fly-wheel clutch indicated by the casing 5 thereof, a change gear 6 and an axle gear 7 located between the fly-wheel or the clutch and the change gear 6, by which the wheels (not shown) are driven by means of cardan shafts such as 8. The drive aggregate is arranged on a sub-frame, comprising two laterally spaced longitudinal girders 9, a front transverse girder 10, a rear transverse girder member 11 having a particularly broad profile and a single transverse girder member 12, which extends above the drive aggregate and which is rigidly connected with the longitudinal girders 9 of the sub-frame by connecting members 13. The sub-frame is supported by means of members, such as 14 and 15 which are elastic in all directions, and arranged in the transverse girder 3 and in the upper transverse girder 12, respectively, of the supporting framework of the car body structure 1, the members 15 are approximately in the vertical transverse plane of the wheel axle (not shown). Furthermore the guide members (not shown), for example the guides of a parallel guidance of the wheels can be attached to the sub-frame, the wheel-springs (not shown) preferably abutting against the ends of the transverse girder 12.

The drive aggregate, the center of gravity of which is indicated in the drawing by S, is arranged on the sub-frame 9, 10, 11 in two lateral bearings 16, which are located in the transverse plane Q—Q, which crosses the center of gravity. The construction of this bearing, which receives the weight of the drive aggregate, is shown on an enlarged scale in Fig. 3. At the crossing points of the transverse girder 10 with the longitudinal girders 9 of the sub-frame trestles 17 are provided, which comprises each two pressed sheet metal parts, which are screwed or welded to each other. It carries an intermediate ring-shaped flange or collar 18. Two rubber rings 19 and 20 are inserted, one on each side in the ring or collar 18, and are fixedly connected to the pressed sheet metal parts of the trestle 17. Two outside metal collars or disks 21 and 22, which are preferably fixedly connected to the face of the rubber rings 19 and 20 and provided with axial boreholes, cover the rubber rings 19 and 20 toward the outside. On their inner cylindrical face the rubber rings 19 and 20 are supported by a shell or muff 23, which in its middle part is curved as to have a smaller diameter, and therefore allows for a space 24 providing some play for the rubber rings 19 and 20 in radial direction. A screw bolt 25 is arranged in the inner shell 23 and the end disks 21 and 22 and supported in a bearing stand 26 of the engine 4. The rubber rings or buffers 19, 20 can be compressed in axial direction toward each other and toward the intermediate collar 18, as far as the shell 23 permits this, by means of a nut 27 screwed on the end of the bolt 25. It will be understood that the screw bolt 25 acts as a horizontal pivot fixed to the bearing stand 26 of the engine 4 and forms together with the outside collars 21, 22, the rubber rings 19, 20, the intermediate collar 18, and the shell or muff 23, elastic means termed hereinafter the first elastic means.

In Fig. 3 the rubber buffers 19, 20 are shown under the load of the weight of the drive aggregate. The rubber rings 19 and 20 are hereby principally strained in vertical direction under a shearing, or transverse action.

An overloading of the rubber buffers 19, 20 may be prevented by an appropriate design of the trestle 17, against which the rubber rings 19, 20 abut when they are subjected to a certain deformation. Since the design of the rubber rings 19, 20 results in a suitably high resiliency of the bearing 16 in every direction within the transverse plane Q—Q, the drive aggregate is simultaneously enabled to swing freely around a longitudinal axis passing through the center of gravity. However, in longitudinal direction of the drive aggregate the bearing 16 is relatively stiff.

In order to prevent the tilting or turning of the drive aggregate around the two bearings 16, which are located in the transversal plane containing center of gravity, the drive aggregate is supported at its rear end by two members 28. As shown in particular in Fig. 4, a ledge 29 is screwed for this purpose to the member 28 which comprises two pressed sheet metal parts which form a U-shaped structure, and are arranged at the rear end of the change gear 6, for example by forming a ring-shaped flange. This ledge on its part embraces on both sides one or two plate-shaped ledges 30, which in turn are screwed to the transverse girder member 11 of the sub-frame. Between the U-shaped ledge 29 and the middle ledge 30 two ledge shaped rubber buffers 31 and 32 are inserted, which are adhesively connected to the metal ledges, for example by vulcanization. If the drive aggregate, under the action of a torque around a transverse axis, has the tendency to tilt forward or backward, the rubber buffers 31 and 32 afford a resilient resistance by being strained on shearing in vertical direction. The ledges 29, 30 and the ledge-like rubber members 31, 32 are referred to hereinafter as the second elastic means.

In the embodiment shown in Fig. 6 the bearings 16', which receive the weight of the drive aggregate and are arranged at the level of the center of gravity S, define an axis X—X of longitudinal natural oscillation, determined by the arrangement of the rubber buffers, in contrast to oscillations of the drive aggregate. The bearings 16' can for this purpose be arranged on trestles 17' connected to the longitudinal girder 9', which in itself is resiliently supported at the supporting framework of the car body structure 1 by resilient members 14' and 15', the member 15' being arranged so as to connect the front cross girder 2 with the longitudinal girder 9'.

The invention is not restricted to the embodiments shown in the drawings. For example the sub-frame may have a different structure or arrangement. Likewise the elastic suspension or support can also be executed by differently shaped rubber buffers, which are not adhesively connected to the metal parts. The drive aggregate, supported elastically in accordance with the invention can consist of engine, change gear and axle gear as in the described embodiments or, of the engine only, or of the engine and the change gear or of any other suitable combination.

What I claim is:

1. In a motor vehicle, in combination a body structure, a sub-frame, a drive aggregate, elastic means for connecting said sub-frame with said body structure in one transverse plane of the vehicle, further elastic means for connecting said sub-frame with said body structure in another transverse plane of the vehicle substantially remote from said first-mentioned transverse plane, first elastic means for connecting said drive aggregate to said sub-frame, said first elastic means extending in a transverse plane substantially through the center of gravity of said drive aggregate and including means providing greater elasticity in said transverse plane than in a longitudinal direction of the vehicle, and second elastic means for connecting said drive aggregate to said sub-frame, said second elastic means extending through a transverse plane substantially remote from the plane of said first elastic means and offering elastic resistance to shearing in the transverse plane of said second elastic means.

2. In a motor vehicle, the combination according to claim 1, wherein said first elastic means includes rubber buffer means located on both sides of the longitudinal center plane of the vehicle substantially in the height of said center of gravity.

3. In a motor vehicle, the combination according to claim 1, wherein the plane through said first elastic means lies outside the space defined between the first-mentioned elastic means and said further elastic means.

4. In a motor vehicle, comprising in combination: a vehicle body, a drive aggregate, said vehicle body and said drive aggregate forming two parts to be connected, first elastic means for suspending said drive aggregate on the vehicle body, said first elastic means being arranged at the same level as the center of gravity and in a plane passing through the center of gravity of said drive aggregate and perpendicular to the longitudinal axis thereof, said first elastic means including a horizontal pivot fixed to one of the parts to be connected, an intermediate collar arranged concentrically to and at a distance from said horizontal pivot, said intermediate collar being connected to the other of the said two parts, two outside collars on the pivot located axially on either side of the intermediate collar, a rubber ring on the pivot between the intermediate collar and each of the two outside collars, whereby the said two parts are movable relatively to each other vertically upon deformation of the rings, and a muff positioned on said pivot and having a reduced diameter intermediate the ends thereof approximately in the plane of the intermediate collar, the ends of said muff being of larger diameter than said reduced diameter and surrounded tightly by said rubber rings, and second elastic means for suspending said drive aggregate on the vehicle body, said second elastic means being arranged at a substantial distance from the center of gravity of said drive aggregate on either side of the central longitudinal vertical plane of the same, said second elastic means being substantially subjected to a shear when said drive aggregate performs an oscillation about a transversal axis passing through the center of gravity of said drive aggregate transversely to the longitudinal axis thereof, said second elastic means being substantially subjected to a change of pressure when said drive aggregate undergoes a dsiplacement in the longitudinal direction thereof.

5. In a motor vehicle the combination in accordance with claim 4, wherein the rubber rings are vulcanized to the intermediate and to the outside collars.

6. In a motor vehicle the combination in accordance with claim 4, wherein the second mentioned elastic means comprise a middle ledge, placed vertically and running in the main transverse to the longitudinal axis of the aggregate and connected to one of the two parts to be connected, two ledges arranged on either side of the middle ledge and connected to the other of the two parts, and two ledge-like rubber members, each arranged between the middle ledge and one of the outside ledges and tightly connected to the middle and outside ledges by vulcanization.

7. In a motor vehicle, the combination in accordance with claim 4 including at least a second horizontal pivot fixed to said one of said parts, said pivots being arranged substantially parallel to the longitudinal axis of the drive aggregate.

References Cited in the file of this patent

UNITED STATES PATENTS

| Number | Name | Date |
|---|---|---|
| 1,602,922 | Midboe | Oct. 12, 1926 |
| 1,815,442 | Masury | July 21, 1931 |
| 1,897,014 | Trott | Feb. 7, 1933 |
| 1,918,490 | Riley | July 18, 1933 |
| 1,940,686 | Lord | Dec. 26, 1933 |
| 2,028,550 | Lord | Jan. 21, 1936 |
| 2,084,080 | D'Aubarede | June 15, 1937 |
| 2,086,370 | Taub | July 6, 1937 |
| 2,123,226 | Benedek | July 12, 1938 |
| 2,246,704 | Tyler et al. | June 24, 1941 |
| 2,254,282 | Griswold | Sept. 2, 1941 |
| 2,322,477 | Sjoberg | June 22, 1943 |
| 2,401,449 | Yates | June 4, 1946 |
| 2,460,586 | Keetch | Feb. 1, 1949 |
| 2,633,203 | Paton | Mar. 31, 1953 |

FOREIGN PATENTS

| Number | Country | Date |
|---|---|---|
| 407,788 | Great Britain | Mar. 29, 1934 |
| 895,171 | France | Mar. 27, 1944 |